(12) United States Patent
Sakata et al.

(10) Patent No.: US 8,886,563 B2
(45) Date of Patent: Nov. 11, 2014

(54) LEAST COST ROUTING AND MATCHING

(75) Inventors: Ross Sakata, Foster City, CA (US); Gourab Basu, Half Moon Bay, CA (US); Michael Mori, San Mateo, CA (US); Steve Cracknell, San Mateo, CA (US); Judson Reed, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 89 days.

(21) Appl. No.: 13/599,969

(22) Filed: Aug. 30, 2012

(65) Prior Publication Data

US 2013/0054465 A1 Feb. 28, 2013

Related U.S. Application Data

(60) Provisional application No. 61/529,068, filed on Aug. 30, 2011.

(51) Int. Cl.
*G06K 5/00* (2006.01)
*G06Q 30/00* (2012.01)
*G06Q 40/00* (2012.01)
*H04W 40/00* (2009.01)
*H04M 15/00* (2006.01)
*G06Q 30/04* (2012.01)
*G06Q 40/02* (2012.01)

(52) U.S. Cl.
CPC ............. *H04M 15/8044* (2013.01); *G06K 5/00* (2013.01); *G06Q 30/00* (2013.01); *G06Q 40/00* (2013.01); *G06Q 30/04* (2013.01); *G06Q 40/02* (2013.01); *H04M 15/8055* (2013.01)
USPC ................ 705/44; 705/26.1; 705/35; 705/39; 705/40; 235/380; 455/445

(58) Field of Classification Search
None
See application file for complete search history.

(56) References Cited

U.S. PATENT DOCUMENTS

| | | | | |
|---|---|---|---|---|
| 5,325,290 A * | 6/1994 | Cauffman et al. | ............... | 705/34 |
| 6,597,688 B2 * | 7/2003 | Narasimhan et al. | .......... | 370/353 |
| 7,290,704 B1 * | 11/2007 | Ball et al. | ....................... | 235/380 |
| 7,752,134 B2 | 7/2010 | Spear | | |
| 7,925,583 B2 | 4/2011 | Heasley | | |
| 7,962,382 B1 * | 6/2011 | Tancredi et al. | ................. | 705/30 |
| 8,027,917 B2 * | 9/2011 | Easterly et al. | .................. | 705/39 |
| 8,311,945 B2 * | 11/2012 | Hawkins et al. | ................. | 705/45 |
| 8,312,148 B2 * | 11/2012 | Anthias et al. | ................. | 709/227 |
| 8,606,706 B2 * | 12/2013 | Zanzot et al. | ................... | 705/40 |
| 8,639,629 B1 * | 1/2014 | Hoffman | ......................... | 705/67 |
| 8,788,565 B2 * | 7/2014 | Bevan | ........................... | 709/201 |

(Continued)

*Primary Examiner* — Gregory Johnson
(74) *Attorney, Agent, or Firm* — Kilpatrick Townsend & Stockton LLP

(57) ABSTRACT

Systems and methods are disclosed for routing a transaction based on an assessment of costs associated with multiple payment processing networks. A transaction broker server determines how to route a received authorization request message for a transaction based on a first cost associated with processing the transaction via a first payment processing network and a second cost associated with processing the transaction via a second payment processing network. If the first cost is less than or equal to the second cost, the authorization request message is routed to the first payment processing network. If the first cost exceeds the second cost, at least one rule is applied to determine whether the first cost is to be reduced. If the at least one rule is satisfied, the first cost is reduced and the authorization request message is routed to the first payment processing network.

21 Claims, 6 Drawing Sheets

(56) References Cited

U.S. PATENT DOCUMENTS

| | | | |
|---|---|---|---|
| 2003/0023552 A1* | 1/2003 | Kight et al. | 705/40 |
| 2003/0055783 A1* | 3/2003 | Cataline et al. | 705/40 |
| 2003/0058277 A1* | 3/2003 | Bowman-Amuah | 345/765 |
| 2003/0074250 A1* | 4/2003 | Burk | 705/10 |
| 2003/0079221 A1* | 4/2003 | Bruner | 725/23 |
| 2003/0229590 A1* | 12/2003 | Byrne et al. | 705/40 |
| 2003/0236726 A1* | 12/2003 | Almonte et al. | 705/35 |
| 2004/0049456 A1* | 3/2004 | Dreyer | 705/40 |
| 2004/0167852 A1* | 8/2004 | Cutler et al. | 705/39 |
| 2004/0267643 A1* | 12/2004 | Armes et al. | 705/30 |
| 2005/0171898 A1* | 8/2005 | Bishop et al. | 705/39 |
| 2005/0181796 A1* | 8/2005 | Kumar et al. | 455/445 |
| 2006/0015405 A1* | 1/2006 | Bala et al. | 705/14 |
| 2006/0206425 A1* | 9/2006 | Sharma | 705/40 |
| 2006/0248009 A1* | 11/2006 | Hicks et al. | 705/40 |
| 2006/0282382 A1* | 12/2006 | Balasubramanian et al. | 705/44 |
| 2007/0038560 A1* | 2/2007 | Ansley | 705/39 |
| 2007/0125842 A1* | 6/2007 | Antoo et al. | 235/380 |
| 2007/0233597 A1* | 10/2007 | Petersen et al. | 705/39 |
| 2007/0239568 A1* | 10/2007 | Conley et al. | 705/28 |
| 2008/0243685 A1* | 10/2008 | Antoo | 705/40 |
| 2009/0031415 A1* | 1/2009 | Aldridge et al. | 726/15 |
| 2009/0063291 A1* | 3/2009 | Robbins et al. | 705/26 |
| 2009/0063339 A1* | 3/2009 | Santora | 705/41 |
| 2009/0070246 A1* | 3/2009 | Tieken | 705/35 |
| 2009/0112747 A1* | 4/2009 | Mullen et al. | 705/35 |
| 2009/0164330 A1* | 6/2009 | Bishop et al. | 705/19 |
| 2009/0171796 A1* | 7/2009 | Carroll et al. | 705/17 |
| 2009/0177563 A1* | 7/2009 | Bernstein et al. | 705/30 |
| 2009/0306819 A1* | 12/2009 | Insolia et al. | 700/232 |
| 2009/0327133 A1* | 12/2009 | Aharoni et al. | 705/44 |
| 2010/0100480 A1* | 4/2010 | Altman et al. | 705/40 |
| 2010/0161466 A1* | 6/2010 | Gilder | 705/34 |
| 2010/0235277 A1* | 9/2010 | Van Rensburg et al. | 705/40 |
| 2010/0325048 A1* | 12/2010 | Carlson et al. | 705/44 |
| 2011/0106695 A1* | 5/2011 | Fernandez | 705/39 |
| 2011/0202415 A1* | 8/2011 | Casares et al. | 705/17 |
| 2011/0238596 A1* | 9/2011 | Giordano et al. | 705/400 |
| 2011/0246358 A1* | 10/2011 | Blackhurst et al. | 705/39 |
| 2011/0302083 A1* | 12/2011 | Bhinder | 705/44 |
| 2012/0041881 A1* | 2/2012 | Basu et al. | 705/67 |
| 2012/0072347 A1 | 3/2012 | Conway | |
| 2012/0179559 A1* | 7/2012 | Rogers et al. | 705/16 |
| 2012/0265680 A1* | 10/2012 | Lynch et al. | 705/44 |
| 2012/0271765 A1* | 10/2012 | Cervenka et al. | 705/44 |
| 2012/0323669 A1* | 12/2012 | Kohlmeier | 705/14.38 |
| 2013/0282563 A1* | 10/2013 | Masterson et al. | 705/39 |

* cited by examiner

400 ↘

| Excess Network Capacity | Minimum Fee Requirement |
|---|---|
| 0-19% | n/a |
| 20-39% | $0.04 |
| 40-59% | $0.03 |
| > 60% | $0.02 |

| Percentage of Target Volume Actually Processed | Minimum Fee Requirement |
|---|---|
| 91% - 100% | $0.04 |
| 81% - 90% | $0.03 |
| 71% - 80% | $0.02 |
| < 70% | $0.01 |

*FIG. 4B*

LEAST COST ROUTING AND MATCHING

CROSS-REFERENCES TO RELATED APPLICATIONS

The present application is a non-provisional application of and claims priority to U.S. Provisional Application No. 61/529,068, filed on Aug. 30, 2011, the entire contents of which are herein incorporated by reference for all purposes.

BACKGROUND

Recent regulatory changes have created an emerging environment of expanded choice of payment processing networks for merchants. Merchants may route transactions to various payment processing networks based on factors such as pricing incentives and services offered by the networks.

Maintaining connections to various payment processing networks may be costly and time consuming for merchants. For example, in addition to their primary network connection, merchants may need to maintain a data backup associated with each network. Perhaps even more costly from a time consuming perspective are the ongoing changes required to network interfaces that are driven by the ongoing innovations occurring in payments. These changes to a payment processing network may require the merchant to make constant adjustments to the network interface for that network. As the number of networks with which the merchant interfaces increases, maintenance expenses increase accordingly.

Embodiments of the invention solve these and other problems.

BRIEF SUMMARY

Techniques are described for routing a transaction based on an assessment of costs associated with multiple payment processing networks.

One embodiment of the technology is directed to a method for routing a transaction. The method includes receiving, by a transaction broker server, an authorization request message for the transaction. A first cost associated with processing the transaction via a first payment processing network is determined. A second cost associated with processing the transaction via a second payment processing network is determined. The first cost is compared with the second cost. If the first cost is less than or equal to the second cost, the authorization request message is routed to the first payment processing network. If the first cost exceeds the second cost, at least one rule is applied to determine whether the first cost is to be reduced. If the at least one rule is satisfied, the first cost is reduced and the authorization request message is routed to the first payment processing network. If the at least one rule is not satisfied, the authorization request message is routed to the second payment processing network.

According to another embodiment of the technology, an authorization request message is received for the transaction by a transaction broker server. A first cost associated with processing the transaction via a first payment processing network is determined. A second cost associated with processing the transaction via a second payment processing network is determined. The first cost is compared with the second cost. If the first cost is less than or equal to the second cost, the authorization request message is routed to the first payment processing network. If the first cost exceeds the second cost, a first rule is applied. If first rule is satisfied, it is determined whether the second cost is greater than or equal to a minimum fee associated with the first rule. If the second cost is greater than or equal to a minimum fee associated with the first rule, the first cost is reduced and the authorization request message is routed to the first payment processing network. If the second cost is less than a minimum fee associated with the first rule, the authorization request message is routed to the second payment processing network.

A further embodiment of the technology is directed to a system for routing an authorization request message. The system comprises a processor and a computer readable medium coupled to the processor. The computer readable medium comprises code executable by the processor for implementing a method of routing transactions.

These and other embodiments are described in further detail below.

BRIEF DESCRIPTION OF THE DRAWINGS

FIG. 4A is an illustrative table indicating a relationship between minimum fee requirements and various ranges of excess network capacity for a payment processing network.

FIG. 4B is an illustrative table indicating a relationship between minimum fee requirements and various ranges of percentage of volume target actually processed for a payment processing network.

DETAILED DESCRIPTION

Figure 1:
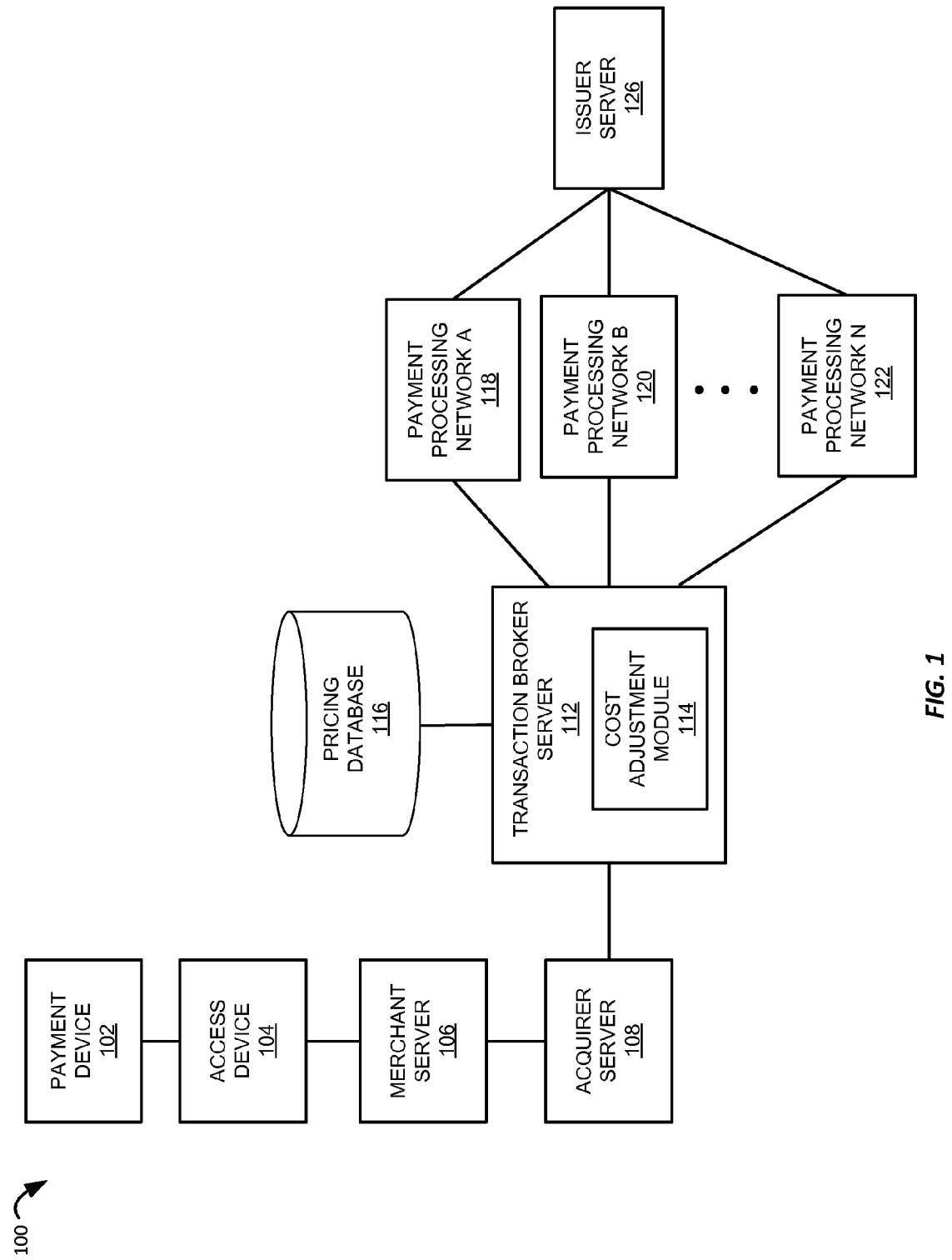
FIG. 1 is an illustrative block diagram of a transaction processing system.

Systems and methods are described for determining whether to adjust a cost associated with processing a transaction. A service capable of routing a transaction to one of a plurality of payment processing networks may adjust the cost associated with an affiliated payment processing network based on a comparison of the costs associated with processing the transaction via each of the payment processing networks.

Terms used to describe embodiments herein can be understood with reference to the descriptions provided below:

A "transaction broker" can be a service that provides a single interface for processing transactions via various payment processing networks. The transaction broker service may be used by merchants and acquirers to access to multiple payment processing networks. A transaction broker service may include a software application executed by a processor of a transaction broker server. The application may receive an authorization request message for a transaction and apply one or more criteria to determine how to route the transaction.

An "authorization request message" can be a request to authorize a transaction. The authorization request message can be sent to an issuer of a payment account to request authorization of a transaction performed with the payment account. A merchant may generate the authorization request message. The authorization request message may be transmitted to the issuer via an acquirer.

The authorization request message may include a payment account identifier. The payment account identifier may be associated with a portable consumer device, such as a credit card or debit card. For example, a payment account identifier may be a credit card account number associated with a credit card, or a debit account number associated with a debit account. The authorization request message may have a defined format to facilitate requests and responses between points in a financial network.

An authorization request message may be a standardized interchange message such as a message that complies with International Organization for Standardisation (ISO) 8583, which is a standard for systems that exchange electronic transactions made by cardholders using payment cards or other electronic data interchange formats. An ISO 8583 message can include a message type indicator, one or more bitmaps indicating which data elements are present in the message, and data elements of the message. The data included in the authorization request message may include data obtained from a payment device as well as other data related to the transaction, the payment account holder, the merchant, and processing information, such as one or more of a payment account number, a payment device expiration date, a currency code, a transaction amount, a merchant transaction stamp, the acceptor city, the acceptor state/country, a routing transit number, a terminal identification, a network identification, etc. An authorization request message may be protected using a secure encryption method (e.g., 128-bit SSL) in order to prevent data from being compromised.

An "acquirer" is typically a business entity (e.g., a commercial bank) that has a business relationship with a particular merchant. For example, the acquirer may deposit funds into a merchant bank account and recoup those funds from issuers.

An "issuer" is typically a business entity (e.g., a bank or credit union) which issues a payment device to an account owner and provides administrative and management functions for the payment account. Some entities may perform both issuer and acquirer functions. A payment account may be any account usable in a transaction, such as a credit, debit or prepaid account.

A "payment device" may refer to a device used to initiate a transaction, such as a portable consumer device or a portable communication device. The payment device may interface with an access device such as a point of sale device to initiate the transaction. Typically, a portable consumer device is hand-held and compact so that it can fit into a consumer's wallet or pocket (e.g., pocket sized). Specific examples of portable consumer devices include payment cards such as smartcards, debit devices (e.g., a debit card), credit devices (e.g., a credit card), or stored value devices (e.g., a stored value card or "prepaid" card). A portable communication device, also referred to as a "mobile device," may be, for example, a cellular or wireless telephone (e.g., a smartphone), personal digital assistant (PDA), portable computer (e.g., tablet or laptop computer), pager, or other portable device carried by the payment account holder.

An "access device" may refer to a device that receives information from a payment device to initiate a transaction. For example, an access device may be a point of sale device configured to read account data encoded in a magnetic stripe or chip of a card-format portable consumer device. Other examples of access devices include cellular phones, PDAs, personal computers, tablets, handheld specialized readers, set-top boxes, electronic cash registers, automated teller machines (ATMs), virtual cash registers, kiosks, security systems, access systems, and the like. Access devices may use means such as radio frequency (RF) and magnetic stripe readers to interact with a payment device. The access device may be a device located at a merchant's physical location or may be a virtual point of sale such as a web-site that is part of an eCommerce (electronic commerce) transaction. In an eCommerce transaction, the account owner may enter payment account data into a portable communication device, personal computer, or other device capable of communicating with a merchant computer. In a further example, communication may occur between a contactless element of a portable communication device and an access device, such as a merchant device reader or point of sale terminal, by using a wireless communications mechanism, such as near field communications (NFC), RF, infra-red, optical communications, etc.

A "payment processing network" can include a network that processes payments. Payment processing network may include a system that receives accumulated transaction information from merchants, acquirers, and/or a transaction broker. The transaction information may be received at a fixed time each day. The payment processing network may perform a settlement process, which can involve posting the transactions to the accounts associated with the payment devices used for the transactions and calculating the net debit or credit position of each user of the payment devices. An exemplary payment processing network is Interlink®.

An "affiliated payment processing network" may be a payment processing network that is associated with a transaction broker. For example, a transaction broker and an affiliated payment processing network may be owned and/or operated by the same business entity.

One or more fees may be charged by a payment processing network for processing a transaction. A "cost associated with processing a transaction" (also referred to as a "transaction cost") may refer individually to a processing fee, an interchange fee, or another fee assessed when a transaction is processed. The transaction cost may also refer to an aggregate of all fees for processing the transaction (also referred to as a "total cost").

A "server" can include one or more computers. Multiple computers of a server may be communicatively coupled via network connections, such as wired, wireless, and/or internet network connections. One or more of the computers of a server may store databases.

Price Adjustment Overview

Merchants and acquirers are increasingly able to route transactions to multiple payment processing networks. By comparing the pricing available from multiple networks, merchants and acquirers have the potential to determine the most beneficial pricing for each transaction generated. However, developing and maintaining a system that can evaluate and re-route transactions in real-time based on cost advantage can be complex and expensive. Further, the overhead associated with maintaining connections and requisite backup links to each of the multiple networks can be significant.

Merchants and acquirers may use a transaction broker service that provides a single interface for routing transactions to multiple payment processing networks. This can shift the burden associated with maintaining connections to multiple payment processing networks from merchants and acquirers to the transaction broker. Transactions may be routed in real-time according to merchant preferences and/or criteria established by the transaction broker. Moreover, users of the service derive this benefit without incurring the development complexity and maintenance expense of trying to create such services themselves.

A transaction broker may be capable of providing merchants and acquirers with the lowest available transaction cost by determining which of multiple payment processing networks available for a transaction is the least cost network.

Accordingly, the transaction broker may always route transactions to a least cost network.

An entity that operates a transaction broker and an affiliated payment processing network may desire to sacrifice margin on some transactions in order to increase the number of transactions processed by the affiliated payment processing network. For example, the affiliated payment processing network may have excess network capacity for handling transactions. In another example, it may be desirable to increase transactions to reach a projected number of transactions processed (i.e., a transaction volume target) or revenue from processed transactions over a given period of time (i.e., a revenue target). By dynamically reducing the transaction cost for the affiliated payment processing network based on various cost adjustment criteria, the affiliated payment processing network can offer competitive transaction costs to merchants and acquirers while achieving desired transaction processing levels.

According to some embodiments, a transaction broker service may include a cost adjustment feature. When the transaction broker receives an authorization request message for a transaction, the transaction broker may determine which payment processing networks are available to process the transaction. A transaction cost associated with processing a transaction via each of the available networks may be determined.

The transaction cost for a payment processing network may vary based on factors such as whether the client of the payment processing network is a merchant or acquirer, whether the merchant or acquirer has standard pricing or negotiated pricing, etc. A payment processing network may implement a tiered pricing model in which volume incentives are offered to merchant. Tiered pricing models can include fill-a-tier models in which transaction costs are assigned to transactions that fill each volume range of a tiered pricing structure and pick-a-tier models in which one prices applies to all transactions based on a total volume tier achieved. Transaction costs may be affected by fees such as surcharge fees, penalty fees, fees that apply to a transaction based upon specific transaction routing scenarios, etc. The geographic location of the merchant originating the transaction and/or the geographic location of the issuer may also affect transaction costs. Transaction costs may also vary based upon schedules with specific effective and expiration dates and/or times. Transaction costs, and in particular interchange fees, may vary based on transaction size, industry specific data requirements (e.g., car rental, bill payment, eCommerce, hotel, healthcare, transit, etc.), transaction amount tolerances, merchant category codes (MCC), merchant verification value (MVV), geography and time frame.

Based on the determined transaction costs, the transaction broker can determine a least cost payment processing network. The least cost payment processing network is the network that charges the least amount for processing a transaction. The transaction broker may route the transaction to the least cost payment processing network. In this manner, a merchant can benefit from using a transaction broker service to route transactions to multiple payment processing networks without having to bear the costs of maintaining connections to multiple networks.

A transaction broker may have an affiliated payment processing network. If a transaction cost for the affiliated payment processing network exceeds the transaction cost for the lowest cost payment processing network, the transaction broker may reduce the transaction cost for the affiliated payment processing network. The transaction broker may apply one or more rules to determine whether to reduce the transaction cost. For example, the transaction broker may reduce the transaction cost only if the affiliated payment processing network currently has excess network capacity. When the transaction broker reduces a transaction cost for an affiliated payment processing network, the transaction broker may route the authorization request message for the transaction to the affiliated payment processing network.

A debit transaction may incur multiple transaction costs, such as an interchange fee and a processing fee. The transaction broker may apply a cost reduction to one or more of the interchange fee component or the processing fee component of the total cost. Reducing an interchange fee may require an agreement with the issuer that an adjusted interchange rate will be adjusted. Reduction of the interchange fee may be contingent on whether such an agreement is in place.

In some embodiments, the transaction broker may be capable of least cost routing and reducing transaction costs for a transaction initiated with a credit card or other payment device.

Transaction costs for payment devices such as credit cards and debit cards may vary based on tiered volume incentives offered to a merchant or acquirer for use of a particular payment processing network, time of day, merchant type, transaction amount, data fields present in an authorization request message, etc. The transaction broker can have the capability to determine the transaction cost for a transaction taking into account one or more of these variables. In some embodiments, a transaction cost may be contingent on an action that takes place after a transaction is processed. For example, a transaction cost may be applied to a transaction for a hotel room at when a guest checks in. A different transaction cost may apply to the transaction depending on the data contained in, timing and amount of the related transaction at the time of check out. In such cases, an initially applied transaction cost may be altered after the ultimate amount of the transaction is determined.

In some embodiments, a transaction broker service may tailor value added services related to each transaction, based on merchant preference and/or network requirements, using a service adjustment feature. When the transaction broker receives an authorization request message for a transaction, the transaction broker may determine which payment processing networks are available to process the transaction. One or more value added services associated with processing a transaction via each of the available networks may be determined. One or more services provided for processing the transaction by an affiliated payment processing network may be adjusted based on the services provided by non-affiliated payment processing networks, or by predetermined merchant preference. When one or more services provided for processing the transaction by an affiliated payment processing network are adjusted, the transaction broker may route the transaction to the affiliated payment processing network.

Transaction Processing System with Transaction Broker Service

FIG. 1 shows an exemplary system 100 in which embodiments of the technology can be implemented. Where only one of each component is shown, it is understood that embodiments of the technology may include more than one of each component. In addition, some embodiments of the technology may include fewer than all of the components shown in FIG. 1. Also, the components in FIG. 1 may communicate via any suitable communication medium (including the internet), using any suitable communication protocol. The exemplary system 100 depicts an example of the system in which cost adjustment may take place.

System 100 includes one or more server computers, data processing subsystems and networks that can be used to initiate an authorization request message for a transaction and route the authorization request message to an entity capable of approving the transaction.

In a typical payment transaction, a payment account holder provides a payment account identifier (e.g., a 16, 18 or 19 digit PAN or primary account number) or payment device identifier (e.g., a phone number) to a merchant, service provider, or other potential recipient of funds. The payment account identifier or payment device identifier may be provided by a card (e.g., a magnetic stripe card or smart card with an embedded chip) to an access device such as a point of sale terminal with a card reader. Alternatively, the payment account identifier may be provided by a contactless element embedded in a mobile device that communicates with a point of sale terminal using a wireless communications protocol. In other embodiments, the payment account identifier is stored in the memory of the mobile device, stored in a database accessible by the mobile device via wireless communications, or any other suitable form.

Typically, an electronic payment transaction is authorized if the payment account holder conducting the transaction is properly authenticated (i.e., their identity and their valid use of a payment account is verified) and has sufficient funds or credit in the payment account to satisfy the transaction. Conversely, if there are insufficient funds or credit in the account, or if the payment device is on a negative list (e.g., it is indicated as possibly having been stolen), then an electronic payment transaction may not be authorized.

In a typical transaction, a payment device 102 interfaces with an access device 104 (or, in some embodiments, with merchant server 106) to initiate a transaction. After access device 104 receives the payment account identifier or the payment device identifier, access device 104 generates an authorization request message for the transaction. Generating the authorization request message may involve communicating with a database storing data such as accountholder identifying information, payment device information, accountholder transaction history, etc. Access device 104 can transmit the authorization request message to the acquirer server 108. Alternatively, Access device 104 can transmit the authorization request message directly to transaction broker server 112. It will be recognized that merchant server 106 can perform the functions described above as being performed by access device 104.

An acquirer may process transactions received from the merchant. Alternatively, an acquirer may outsource the processing of transactions to a third-party processor. The third-party processor may provide a transaction broker service. Acquirer server 106 may receive an authorization request message and transmit the authorization request message to transaction broker server 112.

Transaction broker server 112 may be one or more computers configured to receive authorization request messages from access device 104, merchant server 106, or acquirer sever 108. Transaction broker server 112 may be communicatively coupled to a plurality of payment processing networks (e.g., payment processing networks 118-122). When transaction broker server 112 receives an authorization request message, transaction broker server 112 can apply one or more rules to determine which payment processing network will be the destination of the authorization request message.

Transaction broker server 112 may be communicatively coupled to a server that stores pricing database 116. Alternatively, transaction broker server 112 may store pricing database 116. Pricing database 116 may store data associated with payment processing networks 118-122, such as transaction costs associated with processing a transaction by each of payment processing networks 118-122. A fee structure indicating how different fees are applied to different types of transactions may be stored for each payment processing network.

Transaction broker server 112 may obtain data from payment processing networks 118-122 and store the data in pricing database 116. For example, transaction broker server 112 may query payment processing networks 118-122 to determine fees associated with the payment processing networks communicatively coupled to transaction broker server 112. Transaction broker server 112 may determine fees associated with payment processing networks by other means, such as by accessing a repository of available information accessible by transaction broker server 112. Fee data for payment processing networks may be entered via a user interface communicatively coupled to transaction broker server 112. In some embodiments, payment processing networks may provide fee information to the transaction broker server 112 on a periodic basis and/or at times when fees change.

Cost adjustment module 114 is an application that can be executed by a processor of transaction broker server 112. Cost adjustment module 114 can retrieve data from pricing database 116 to use in determining transaction costs associated with payment processing networks 118-122.

The payment processing network that receives the authorization request message transmits the authorization request message to issuer server 126. The issuer server 126 generates an authorization response message indicating whether the transaction was authorized. The authorization response message can be routed back to the merchant server 106. The authorization response may be displayed by the access device 104 (e.g., a POS terminal), printed on a receipt, or otherwise conveyed to the payment account holder.

A clearing and settlement process is typically conducted by each of the payment processing networks at a fixed time. The fixed time may vary from one network to another. A clearing process is a process of exchanging financial details between an acquirer and an issuer to facilitate posting to the payment account holder's account and reconciliation of the consumer's settlement position. Clearing and settlement may occur simultaneously.

Figure 2:
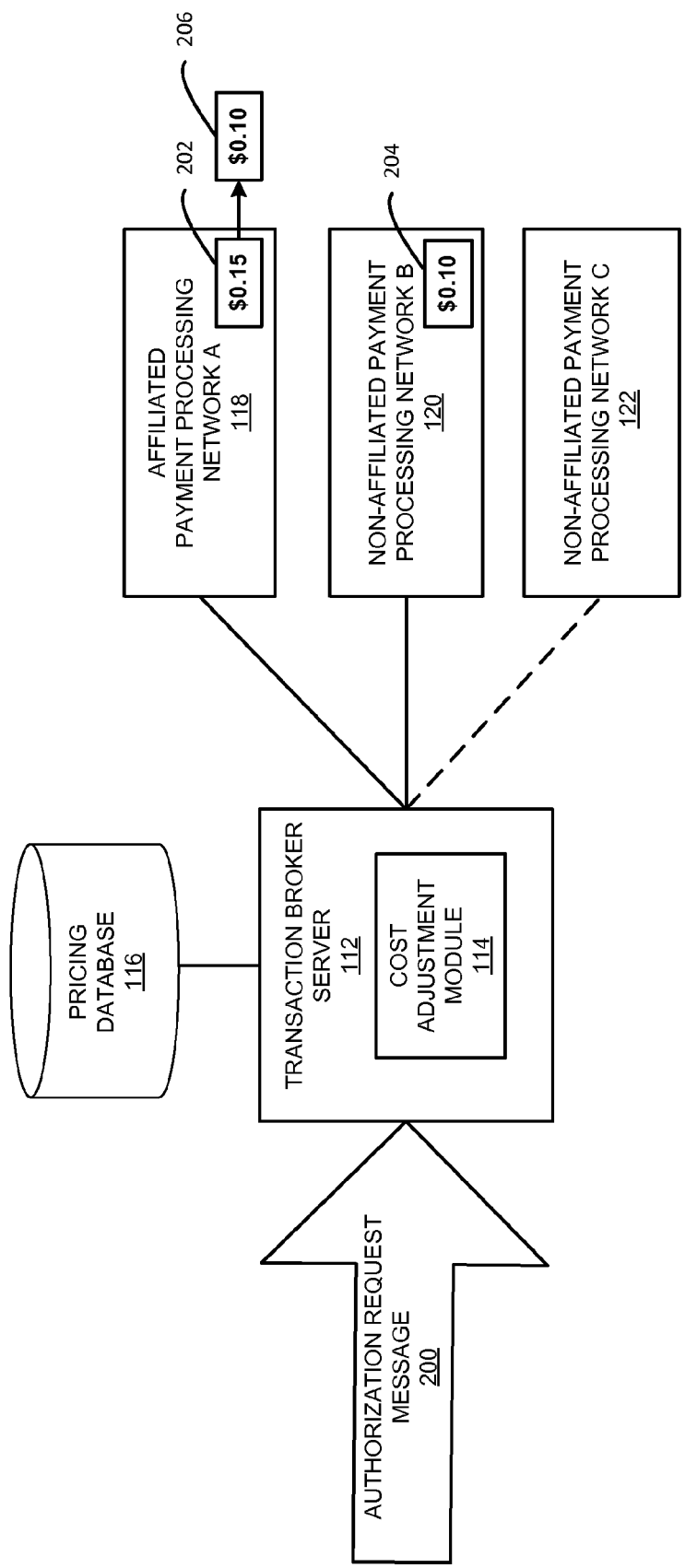
FIG. 2 is an illustrative block diagram indicating use of a transaction processing system for least cost routing and matching.

FIG. 2 illustrates an exemplary use of system 100 to route an authorization request message for a transaction. Authorization request message 200 is received by transaction broker server 112, for example, from acquirer server 108.

When an authorization request message is received by transaction broker server 112, cost adjustment module 114 can determine which payment processing networks are available to process the authorization request message. For example, a payment processing network that is connected to the transaction broker may be unavailable because it is not a participating network for the payment device used for the transaction. Cost adjustment module 114 may parse an authorization request message to determine information indicating participating networks for a payment device. In another example, a payment processing network may not be available because the merchant that generated the authorization request message did not select the payment processing network for processing transactions. In some embodiments, merchants may establish routing preferences that limit payment processing networks available to process a transaction according to parameters such as transaction type, transaction amount, regulatory status, payment processing network services and incentives, any other parameter that may be used in establishing a transaction cost, etc. A transaction may not qualify for an indicated network due to lack of required data, origination from an embargoed country, restricted merchant category, or other network rules or requirements that are not met, and thus the transaction may be rerouted by the transaction broker. In a further example, a payment processing network may be unavailable due to a network outage. Alternatively, the transaction broker may deem a network to be unavailable due to a high decline rate for transactions routed to the payment processing, a high number of timeouts, etc.

In the illustrative example of FIG. 2, cost adjustment module 114 has determined that payment processing network A 118 and payment processing network B 120 are available, as indicated by the solid lines connecting these networks to transaction broker server 112. Cost adjustment module 114 has determined the payment processing network C 122 is unavailable, as indicated by the dashed line.

Cost adjustment module 114 can query pricing database 116 to obtain transaction costs associated with payment processing network A and payment processing network B (e.g., fees that would be applied by the payment processing networks if the transaction were routed to either of those networks). In the illustrative example shown in FIG. 2, the cost adjustment module 114 has determined that payment processing network A 118 has a transaction cost of $0.15, as indicated at 202, and payment processing network B 120 has a transaction cost of $0.10, as indicated at 204. Based on a comparison of the transaction costs for the payment processing networks, cost adjustment module 114 can determine a least cost network. For example, comparing the transaction costs for payment processing network A and payment processing network B, cost adjustment module 114 would determine that payment processing network B is the least cost network, because a transaction cost of $0.10 associated with payment processing network B is less than a transaction cost $0.15 associated with payment processing network A. In some embodiments, cost adjustment module 114 can route the authorization request message to payment processing network B on the basis that payment processing network B is the least cost network.

In an alternative embodiment, cost adjustment module 114 can determine whether affiliated payment processing network A 118 is the least cost network, by determining whether the transaction cost associated with payment processing network A 118 is less than or equal to the transaction cost associated with payment processing network B 120. If cost adjustment module 114 determines that an affiliated payment processing network is not the least cost network, cost adjustment module 114 can determine whether to adjust a transaction cost for the affiliated payment processing network. In the illustrative example of FIG. 2, non-affiliated payment processing network B 120 is the least cost network. Thus, cost adjustment module 114 would determine that affiliated payment processing network A 118 is not the least cost network.

Cost adjustment module 114 can reduce the transaction cost associated with affiliated payment processing network A. For example, cost adjustment module 114 can reduce the transaction cost to match the transaction cost associated with payment processing network B. In the illustrative example of FIG. 2, cost adjustment module 114 can reduce the transaction cost for payment processing network A from $0.15 to $0.10 (as indicated at 206) to match the transaction cost of payment processing network B.

In some embodiments, cost adjustment module 114 applies one or more criteria (also referred to as "rules") to determine whether to reduce the transaction cost. For example, cost adjustment module 114 may determine whether excess network capacity of the affiliated payment processing network exceeds a threshold capacity (e.g., cost adjustment module 114 may reduce the transaction cost for an affiliated payment processing network if network capacity exceeds 20%). In another example, cost adjustment module 114 may reduce the transaction cost by a first amount if a first rule is satisfied (e.g., network capacity is within a first range) and by a second amount if a second rule is satisfied (e.g., network capacity is within a second range). Additional examples of price adjustment criteria that may be used are described with reference to FIGS. 4A-4B.

If cost adjustment module 114 reduces the transaction cost for an affiliated payment processing network, cost adjustment module 114 may route the transaction to the affiliated payment processing network.

Although in the above example cost adjustment module 114 performs a comparison between two payment processing networks (affiliated network A and non-affiliated network B), it will be recognized that cost adjustment module 114 may determine a least cost network having a lowest associated transaction cost among three or more payment processing networks, one of which is an affiliated payment processing network.

Figure 3:
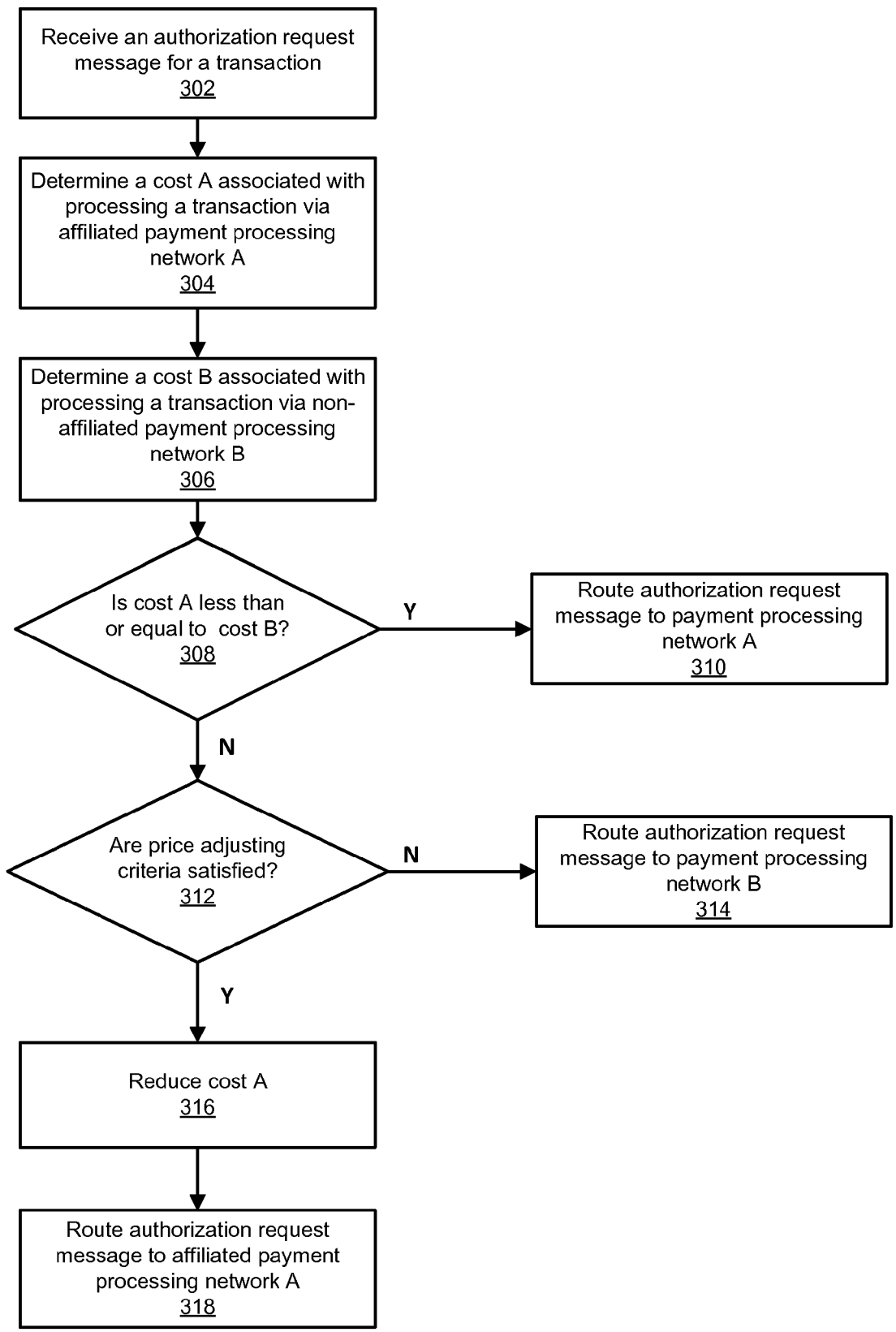
FIG. 3 is an illustrative flow diagram showing operations involved in least cost routing and matching.

FIG. 3 is a flow diagram showing operations involved in least cost routing and matching, according to an embodiment. At operation 302, transaction broker server 112 receives an authorization request message for a transaction. For example, the authorization request message may be received from access device 104 (e.g., via one or more of merchant server 106 and acquirer server 108). At operation 304, cost adjustment module 114 determines a cost A associated with processing a transaction via an affiliated payment processing network A. At operation 306, cost adjustment module 114 determines a cost B associated with processing a transaction via a non-affiliated payment processing network B. At decision diamond 308, cost adjustment module 114 determines whether cost A is less than or equal to cost B. If cost A is less than or equal to cost B, cost adjustment module 114 determines that payment processing network A is the least cost payment processing network. Because payment processing network A is the least cost payment processing network, the authorization request message is routed to payment processing network A, as indicated at operation 310.

If cost A is not less than or equal to cost B, cost adjustment module 114 determines that non-affiliated payment processing network B is the least cost payment processing network. Because non-affiliated payment processing network B is the least cost payment processing network, cost adjustment module 114 determines whether to adjust the transaction cost associated with affiliated payment processing network A.

In some embodiments, the authorization request message is for a transaction that is eligible for processing by multiple non-affiliated networks (e.g., non-affiliated payment processing networks B, C, D, etc.) Costs B, C, and D associated with non-affiliated payment processing networks B, C, and D, respectively, can be determined. Cost adjustment module 114 determines which of networks A-D is the least cost network. If affiliated payment processing network A is the least cost payment processing network, the authorization request message is routed to affiliated payment processing network A. If payment processing network A is not the least cost network, cost adjustment module 114 determines whether to adjust the transaction cost associated with affiliated payment processing network A.

At decision diamond 312, cost adjustment module 114 determines whether one or more price adjusting criteria ("rules") are satisfied. In one example, a rule indicates that if excess network capacity on the affiliated payment processing network exceeds 20%, the transaction cost associated with the affiliated payment processing network will be reduced (e.g., to match the transaction cost associated with the least cost payment processing network).

If the price adjusting criteria are not satisfied (e.g., insufficient excess network capacity on the affiliated payment processing network), the authorization request message can be routed to the non-affiliated least cost network (e.g., payment processing network B), as indicated at block 314.

If the price adjusting criteria are satisfied, cost A can be reduced, as indicated at block 316. For example, cost A may be reduced to match the cost of the non-affiliated least cost network (e.g., cost B). At operation 318, the authorization request message is routed to affiliated payment processing network A, which applies the reduced cost A to the transaction.

In some embodiments, a transaction cost associated with a non-affiliated least cost network may be compared against a minimum fee requirement. For example, ranges corresponding to excess network criteria, revenue targets, transaction volume targets, date ranges, etc. can have associated minimum fee requirements.

FIG. 4A shows a table 400 indicating an exemplary relationship between minimum fee requirements and various ranges of excess network capacity for a payment processing network. For example, when large amounts of excess network capacity exist on an affiliated payment processing network, it may be desirable to reduce a transaction cost to incentivize increased use of the affiliated payment processing network.

In the illustrative example presented in table 400, if the level of excess network capacity for the affiliated payment processing network is within a range of 0-19% (i.e., below a first threshold value of 20%), it may not be desirable to adjust the transaction cost for the network. Accordingly, following the criteria expressed in table 400, the transaction cost will not be reduced when excess capacity is between 0-19%. If the level of excess network capacity for the affiliated payment processing network is within a range of 20-39%, the transaction cost associated with the affiliated payment processing network may be reduced. The minimum value to which the transaction cost can be reduced for the range of 20-39% excess network capacity is $0.04, as indicated in table 400. The minimum value to which the transaction cost can be reduced when excess network capacity is in the range of 40-59% is $0.03. If excess network capacity exceeds 60%, the minimum value to which the transaction cost can be reduced is $0.02. It will be understood that table 400 is merely demonstrative and that alternative network capacity ranges and corresponding minimum fee requirements could be applied.

FIG. 4B shows a table 450 indicating an exemplary relationship between minimum fee requirements and various ranges of percentage of volume target actually processed for a payment processing network. For example, a quarterly transaction volume target may be established for an affiliated payment processing network. At any given point in time (e.g., midway through the quarter), it may be determined that the volume of transactions actually processed is below the target volume for the affiliated payment processing network. To increase the volume of transactions on the affiliated payment processing network, it may be desirable to reduce a transaction cost.

In the illustrative example of table 450, if the percentage of target volume actually processed (i.e., to date since the start of the quarter) is within a range of 91%-100%, a minimum fee requirement may be set at $0.04. When a lower percentage of the target volume has been processed, e.g., 81%-90%, the minimum fee requirement may be set at a lower $0.03 in order to incentivize increased use of the affiliated payment processing network, and so on, as indicated in table 450. It will be understood that table 450 is merely demonstrative and that alternative percentages of total volume actually processed and minimum fee requirements could be applied.

Similar to table 450, minimum fee requirements could be set at descending values corresponding to descending ranges of percentage of revenue actually realized. It will be recognized that other criteria could be used to set minimum fee requirements for various statistics associated with the affiliated payment processing network. For example, a first minimum fee requirement could be associated with a first date range, a second minimum fee requirement could be associated with a second date range, and so on. In this manner, a higher minimum fee requirement could be set for a period of time during which more transactions are expected (e.g., in the weeks before holidays during which gifts are exchanged) relative to periods during which fewer transactions are expected.

Figure 5:
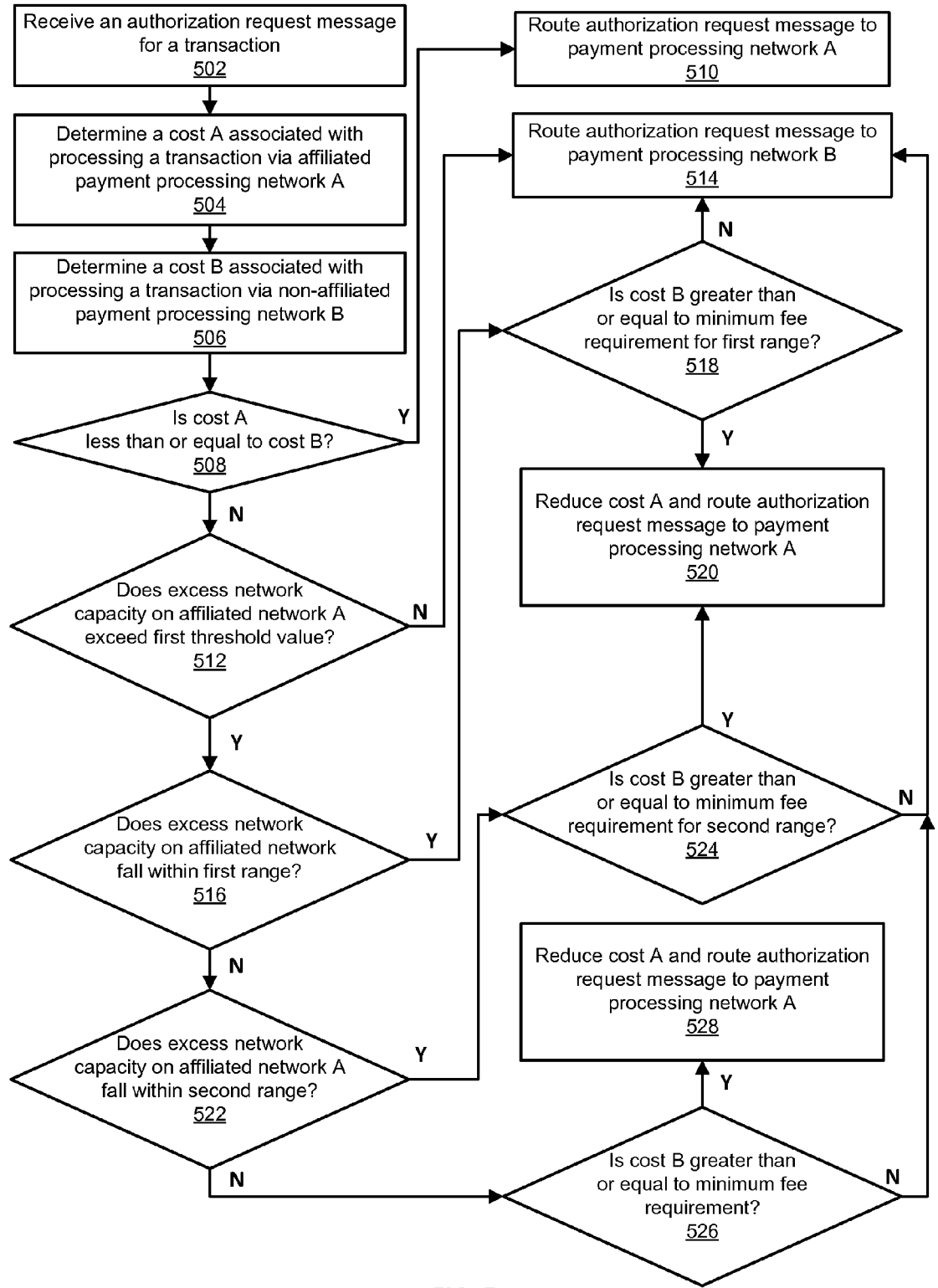
FIG. 5 is an illustrative flow diagram showing operations involved in least cost routing and matching with tiered minimum pricing.

FIG. 5 is a flow diagram showing operations involved in least cost routing and matching with tiered minimum pricing, according to an embodiment. At operation 502, transaction broker server 112 receives an authorization request message for a transaction. At operation 504, cost adjustment module 114 determines a cost A associated with processing a transaction via an affiliated payment processing network A. At operation 506, cost adjustment module 114 determines a cost B associated with processing a transaction via a non-affiliated payment processing network B. At decision diamond 508, cost adjustment module 114 determines whether cost A is less than or equal to cost B. If cost A is less than or equal to cost B, cost adjustment module 114 can determine that payment processing network A is the least cost payment processing network. Because payment processing network A is the least cost payment processing network, the authorization request message is routed to payment processing network A, as indicated at operation 510.

If cost A is not less than or equal to cost B, cost adjustment module 114 determines that non-affiliated payment processing network B is the least cost payment processing network. Because non-affiliated payment processing network B is the least cost payment processing network, cost adjustment module 114 determines whether to adjust the transaction cost associated with affiliated payment processing network A.

At decision diamond 512, cost adjustment module 114 determines whether excess network capacity on affiliated payment processing network A exceeds a first threshold value. For example, in accordance with FIG. 4A, cost adjustment module 114 may determine whether excess network capacity exceeds 19%. If the excess network capacity does not exceed the threshold value, cost adjustment module 114 may determine that no cost reduction will be applied to cost A and the authorization request message will be routed to payment processing network B, as indicated at operation 514.

If the excess network capacity exceeds the threshold value, cost adjustment module 114 may determine whether excess network capacity on affiliated payment processing network A falls within a first range, as indicated at decision diamond 516. For example, cost adjustment module 114 may determine whether excess network capacity falls within the range of 20-39%, in accordance with FIG. 4A. If excess network capacity falls within the first range, cost adjustment module 114 may determine whether cost B is greater than or equal to a minimum fee requirement for the first range, as indicated at decision diamond 518. For example, if excess network capacity falls within the range of 20-39%, cost adjustment module 114 may determine whether cost B is greater than or equal to $0.04, in accordance with FIG. 4A. If cost B is less than the minimum fee requirement for the first range, cost adjustment module 114 may determine that no cost reduction will be applied to cost A and the authorization request message will be routed to payment processing network B, as indicated at operation 514. If cost B is greater than or equal to the minimum fee requirement for the first range, cost adjustment module 114 may reduce cost A and route the authorization request message to affiliated payment processing network A, as indicated at operation 520. For example, cost A may be reduced to match the cost of the non-affiliated least cost network (e.g., cost B).

If the excess network capacity on affiliated payment processing network A does not fall within a first range, cost adjustment module 114 may determine whether excess network capacity on affiliated payment processing network A falls within a second range, as indicated at decision diamond 522. For example, cost adjustment module 114 may determine whether excess network capacity falls within the range of 40-59%, in accordance with FIG. 4A. If excess network capacity falls within the second range, cost adjustment module 114 may determine whether cost B is greater than or equal to the minimum fee requirement for the second range, as indicated at decision diamond 524. For example, if excess network capacity falls within the range of 40-59%, cost adjustment module 114 may determine whether cost B is greater than or equal to $0.03, in accordance with FIG. 4A. If cost B is less than the minimum fee requirement for the first range, cost adjustment module 114 may determine that no cost reduction will be applied to cost A and the authorization request message will be routed to payment processing network B, as indicated at operation 514. If cost B is greater than or equal to the minimum fee requirement for the second range, cost adjustment module 114 reduce cost A and route the authorization request message to affiliated payment processing network A, as indicated at operation 520. For example, cost A may be reduced to match the cost of the non-affiliated least cost network (e.g., cost B).

In some embodiments, at decision diamond 522, if excess network capacity on affiliated network A does not fall within the second range, cost adjustment module 114 may determine whether excess network capacity on affiliated payment processing network A falls within a third range (e.g., 60%-100%) or exceeds a second threshold (e.g., exceeds a threshold of 60%). Similar to the method described above, cost adjustment module 114 may determine whether cost B is greater than or equal to a minimum fee requirement associated with the payment processing network, as indicated at decision diamond 236, and if so, to reduce cost A and route the authorization request message to payment processing network A, as indicated at operation 528.

It will be understood that other criteria may be applied in a manner similar to the method described with reference to FIG. 5. For example, the target volume criteria indicated in FIG. 4B may be applied.

In some embodiments, cost adjustment module 114 may determine a service associated with non-affiliated payment processing network B, such as a fraud alert service. The service may be, for example, a transaction related value added service. If the service is available from network A but not applicable to the transaction (e.g., because the authorization request message for the transaction originated from a merchant or acquirer that does not participate in a plan offering the service), cost adjustment module 114 may apply at least one rule to determine whether to apply the service to the transaction. For example, if excess network capacity exists on an affiliated payment processing network, cost adjustment module 114 may provide the service for the transaction and route the transaction to the affiliated payment processing network.

The various participants and elements described herein with reference to the figures may operate one or more computer apparatuses to facilitate the functions described herein. Any of the elements in the figures, including any servers or databases, may use any suitable number of subsystems to facilitate the functions described herein.

Figure 6:
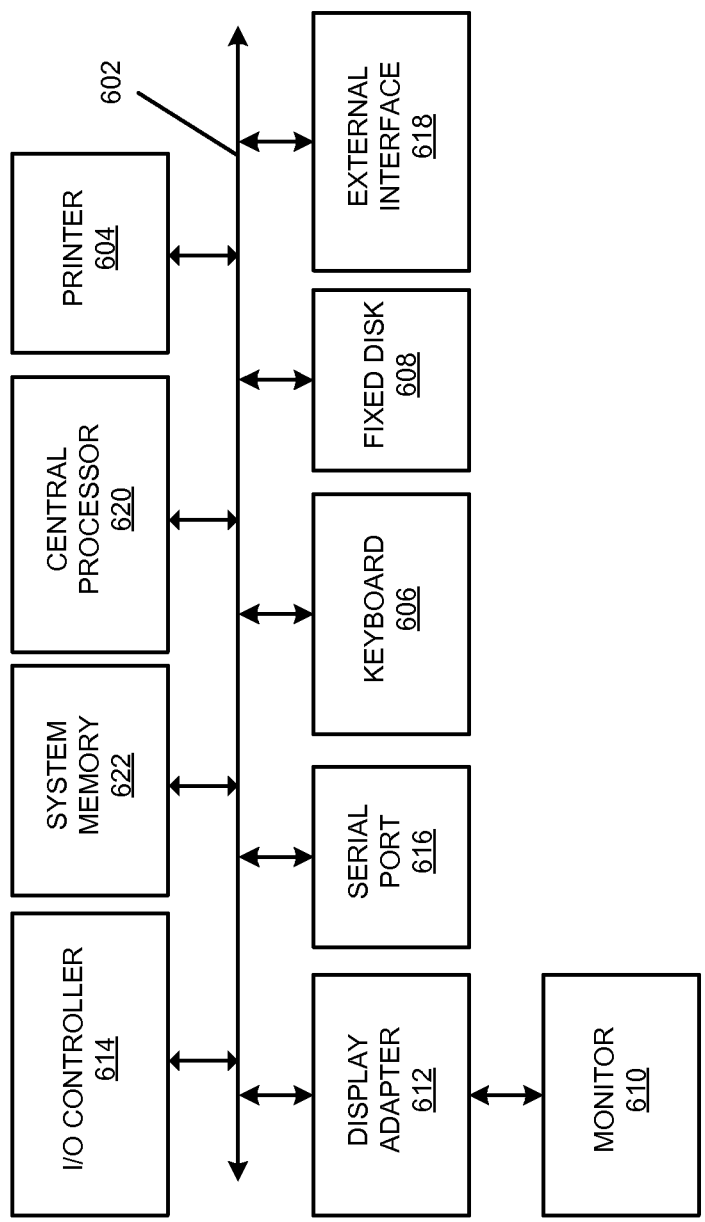
FIG. 6 is a block diagram of an exemplary computer apparatus.

Examples of such subsystems or components are shown in FIG. 6. The subsystems shown in FIG. 6 are interconnected via a system bus 602. Additional subsystems such as a printer 604, keyboard 606, fixed disk 608 (or other memory comprising computer readable media), monitor 610, which is coupled to display adapter 612, and others are shown. Peripherals and input/output (I/O) devices, which couple to I/O controller 614 (which can be a processor or other suitable controller), can be connected to the computer system by any number of means known in the art, such as serial port 616. For example, serial port 616 or external interface 618 can be used to connect the computer apparatus to a wide area network such as the Internet, a mouse input device, or a scanner. The interconnection via system bus allows the central processor 620 to communicate with each subsystem and to control the execution of instructions from system memory 622 or the fixed disk 608, as well as the exchange of information between subsystems. The system memory 622 and/or the fixed disk 608 may embody a computer readable medium.

It should be understood that the present technology as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for routing a transaction, comprising:
receiving an authorization request message for the transaction;
determining a first cost associated with processing the transaction via a first payment processing network;
determining a second cost associated with processing the transaction via a second payment processing network;
comparing, by a transaction broker server, the first cost with the second cost; and
if the first cost is less than or equal to the second cost, routing the authorization request message to the first payment processing network;
if the first cost exceeds the second cost, applying at least one rule to determine whether the first cost is to be reduced; and
if the at least one rule is satisfied:
reducing the first cost, and
routing the authorization request message to the first payment processing network; and
if the at least one rule is not satisfied, routing the authorization request message to the second payment processing network.

2. The method of claim 1, wherein applying the at least one rule includes determining whether excess network capacity exceeds a threshold capacity.

3. The method of claim 1, wherein:
if the network capacity is within a first range, a first reduction is applied to the first cost; and
if the network capacity is within a second range, a second reduction is applied to the first cost.

4. The method of claim 1, wherein applying the at least one rule includes determining whether a number of transactions that have been processed by the first payment processing network over a period of time exceeds a threshold number of transactions.

5. The method of claim 1, wherein applying the at least one rule includes determining whether a revenue value associated with processing transactions by the first payment processing network over a period of time exceeds a threshold revenue value.

6. The method of claim 1, wherein reducing the first cost comprises reducing an interchange fee.

7. The method of claim 1, wherein reducing the first cost comprises reducing a processing fee.

8. The method of claim 1, wherein reducing the first cost comprises reducing the first cost to match the second cost.

9. A method for routing a transaction, comprising:
receiving an authorization request message for the transaction;
determining a first cost associated with processing the transaction via a first payment processing network;
determining a second cost associated with processing the transaction via a second payment processing network;
comparing, by a transaction broker server, the first cost with the second cost; and
if the first cost is less than or equal to the second cost, routing the authorization request message to the first payment processing network;
if the first cost exceeds the second cost, applying a first rule; and
if the first rule is satisfied:
determining whether the second cost is greater than or equal to a minimum fee associated with the first rule; and
if the second cost is greater than or equal to a minimum fee associated with the first rule:
reducing the first cost, and
routing the authorization request message to the first payment processing network; and
if the second cost is less than the minimum fee associated with the first rule, routing the authorization request message to the second payment processing network.

10. The method of claim 9, wherein if the first rule is not satisfied, routing the transaction to the second payment processing network.

11. The method of claim 9, wherein reducing the first cost comprises reducing the first cost to match the second cost.

12. The method of claim 9, further comprising, wherein if the first rule is not satisfied:
applying a second rule; and
if the second rule is satisfied:
determining whether the second cost is greater than or equal to a minimum fee associated with the second rule; and
if the second cost is greater than or equal to a minimum fee associated with the second rule:
reducing the first cost, and
routing the transaction to the first payment processing network; and
if the second cost is less than the minimum fee associated with the second rule, routing the authorization request message to the second payment processing network.

13. The method of claim 12, wherein reducing the first cost comprises reducing the first cost to match the second cost.

14. A system for routing a transaction, comprising:
a processor; and
a computer readable medium coupled to the processor, wherein the computer readable medium comprises code executable by the processor for implementing a method of routing transactions, the method comprising:
receiving an authorization request message for the transaction;
determining a first cost associated with processing the transaction via a first payment processing network;
determining a second cost associated with processing the transaction via a second payment processing network;
comparing the first cost with the second cost; and
if the first cost is less than or equal to second cost, routing the authorization request message to the first payment processing network;
if the first cost exceeds the second cost; applying at least one rule to determine whether the first cost is to be reduced; and
if the at least one rule is satisfied:
reducing the first cost, and
routing the authorization request message to the first payment processing network; and
if the at least one rule is not satisfied, routing the authorization request message to the second payment processing network.

15. The system of claim 14, wherein applying the at least one rule includes determining whether excess network capacity exceeds a threshold capacity.

16. The system of claim 14, wherein:
if the network capacity is within a first range, a first reduction is applied to the first cost; and
if the network capacity is within a second range, a second reduction is applied to the first cost.

17. The system of claim 14, wherein applying the at least one rule includes determining whether a number of transactions that have been processed by the first payment processing network over a period of time exceeds a threshold number of transactions.

18. The system of claim 14, wherein applying the at least one rule includes determining whether a revenue value associated with processing transactions by the first payment processing network over a period of time exceeds a threshold revenue value.

19. The system of claim 14, wherein reducing the first cost comprises reducing an interchange fee.

20. The system of claim 14, wherein reducing the first cost comprises reducing a processing fee.

21. The system of claim 14, wherein reducing the first cost comprises reducing the first cost to match the second cost.

* * * * *